United States Patent Office 3,399,032
Patented Aug. 27, 1968

3,399,032
METHOD OF PREPARING AMMONIUM PHOSPHATE SOLIDS
Donald C. Young, Fullerton, Calif., assignor to Union Oil Company of California, Los Angeles, Calif., a corporation of California
No Drawing. Continuation-in-part of application Ser. No. 183,964, Mar. 30, 1962, now Patent No. 3,241,946, dated Mar. 22, 1966. This application Feb. 21, 1966, Ser. No. 528,817
The portion of the term of the patent subsequent to July 17, 1979, has been disclaimed and dedicated to the Public
7 Claims. (Cl. 23—107)

ABSTRACT OF THE DISCLOSURE

The invention comprises the production of solid, non-hygroscopic ammonium phosphates from wet-process phosphoric acid and ammonia and involves the steps of concentrating the wet-process phosphoric acid by evaporative heating at atmospheric or subatmospheric pressure and introducing anhydrous ammonia into contact with the heated acid while maintaining the temperature and utilizing the exothermic heat of reaction for continuing the evaporative concentration of the acid. The concentration is continued until the acid has the property of forming clear ammonium phosphate solutions having pH values from 5.5 to 10. This property is achieved when a sufficient quantity of acyclic polyphosphoric acids are formed in the acid to prevent the precipitation of the metallic impurities contained therein. A typical treatment comprises heating wet-process phosphoric acid to a temperature of about 185° C. and thereafter introducing anhydrous ammonia while removing volatilized impurities.

---

This is a continuation-in-part application of my co-pending applications, Ser. No. 183,964, filed Mar. 30, 1962, now Patent 3,241,946, and Ser. No. 409,477, filed Nov. 6, 1964, now Patent 3,243,279, which are continuation-in-part applications of my copending application Ser. No. 51,047, filed Aug. 22, 1960, now Patent 3,192,013, which, in turn, is a continuation-in-part of my applications, Ser. No. 649,287, filed Mar. 29, 1957, Ser. No. 666,479, filed June 18, 1957, and Ser. No. 672,558, filed July 18, 1957, now abandoned.

This invention relates to a method for the preparation of solid ammonium phosphate salts from wet-process phosphoric acid.

"Wet-process" phosphoric acid of commerce is manufactured by a process which, in essence, consists of treating phosphate rock (essentially calcium phosphate) with sulfuric acid, whereby there is formed free phosphoric acid and calcium sulfate. The latter, being insoluble, is separated from the acid by filtration. While this process is simple in concept, it is fraught with many technical difficulties and complications, and the resultant phosphoric acid product is a highly impure material, dark in color and containing relatively large amounts of dissolved sulfates and smaller amounts of fluorides, fluorosilicates and other salts of aluminum, magnesium, iron and other materials, as well as suspended organic matter. Wet-process acid is commonly produced and handled at concentrations between about 25 and 52 weight percent phosphorus calculated as the pentoxide.

Because the wet-process phosphoric acid as commonly produced contains fluorine it is unsuited for use as a source of phosphate in animal and poultry feed.

As disclosed in my copending application, neutralization of the aforedescribed dilute wet-process phosphoric acid results in the formation of large volumes of gelatinous precipitates of iron and aluminum as well as precipitates of the other metallic impurities. In the formation of solid products, these precipitates interfere with the crystal formation of salts prepared from the acid and contribute to the formation of friable, low density solids which are hygroscopic and cake in storage.

The solid ammonium phosphate product obtained from dilute wet-process phosphoric acid can not be dissolved to obtain a liquid solution of ammonium phosphate but forms a gelatinous precipitate. The use of conventional dilute wet-process phosphoric acid in granulation process wherein the acid is neutralized with ammonia in a rotating drum results in a very wet reaction mass which must be subsequently dried to produce a solid product. Attempts to obviate this difficulty have, heretofore, involved the addition of extraneous dry solids, e.g., ammonium sulfate, superphosphate, triple superphosphate, etc., to the granulator to reduce the moisture content of the product. While a satisfactorily dry product can be obtained in this manner, the friable nature of the solid results in a large volume of product which is too finely divided for use and which must be recycled to the granulator for reprocessing.

It is an object of this invention to provide a method for the manufacture of ammonium phosphate salts from wet-process phosphoric acid which are nonhygroscopic, hard and dense solids and which can be dissolved in water or aqua ammonia to obtain liquid fertilizers.

In my Patent 3,192,013 I have disclosed that when wet-process phosphoric acid is concentrated to a substantially anhydrous phosphoric acid having a $P_2O_5$ content, impurity free basis between about 68.6 and 80 weight percent, that there are formed acyclic polyphosphoric acids in amounts sufficient to chelate all the nonvolatile or metallic impurities contained in the acid. In my Patents 3,241,946 and 3,243,279 I have disclosed that the anhydrous phosphoric acid when neutralized with ammonia under substantially anhydrous conditions forms ammonium phosphate solids having improved properties, particularly an improved hardness, nonhygroscopicity, resistance to crumbling and possessing a slow dissolution rate.

I have also discovered that the neutralization of the phosphoric acid can be conveniently combined with the heating and concentrating step thereof so that the exothermic heat of reaction can be utilized to aid the volatilization of the volatile impurities and water from the wet-process phosphoric acid. This discovery is the basis of the invention disclosed and claimed herein. The method of this invention therefore comprises the introduction of ammonia, preferably anhydrous ammonia, into the body of the wet-process phosphoric acid undergoing the concentration to provide a simultaneous neutralization and evaporative concentration of a mixture of wet-process acid and ammonium phosphates to produce a nonhygroscopic hard, dense ammonium phosphate solid that possesses all the characteristics and properties of that obtained by neutralization of the anhydrous liquid phosphoric acid disclosed in the parent applications.

The commercial wet-process phosphoric acid used in practicing my invention generally contains 1 to 10 weight percent metallic impurities (expressed as oxides) comprising chiefly iron and aluminum with lesser amounts of magnesium, zinc, copper, chromium and vanadium. Also present can be organic impurities, sulfates, fluorine and silica. A complete description of such acid and the processes by which it is made are set forth in Phosphoric Acid, Phosphates and Phosphate Fertilizers, by W. H. Waggeman, 2nd edition, pages 174–208 (Rheinhold Publishing Corp.), 1952. Such acid is available commercially in both dilute and "concentrated" forms, and contains about 25–35 and about 35–55 weight percent of $P_2O_5$, respectively, and either concentration may be employed. However, in most instances, it is more economical to start with acid in the aforementioned "concentrated" form.

As disclosed in my Patent 3,192,013, the anhydrous acid is prepared by subjecting the wet-process phosphoric acid to a temperature above about 100° C. at superatmospheric, atmospheric or reduced pressures so as to remove the volatile impurities, e.g., silica and fluorine, therefrom. The heating can be batchwise or continuous. During the heating there is a copious evolution of white vapors comprising silica, fluorine and some water vapor from the acid. After these vapors cease to be evolved, generally within 1 to 15 minutes, the heating can be discontinued and further concentration of the acid achieved by addition of anhydrous phosphorus pentoxide or a more highly concentrated acid. Preferably, however, heating of the acid is continued to expel additional amounts of water and form the necessary amount of polyphopshoric acid. Because heating the acid substantially purifies the acid of fluorine and provides a product having an elemental phosphorus to fluorine ratio above 100, the ammonium phosphate solids derived therefrom are rendered suitable for use as a phosphate source in animal and poultry feed.

As previously mentioned, the subject of this application comprises my discovery that the neutralization of the acid can be performed simultaneously with the evaporative concentration previously mentioned. This can be accomplished by introduction of the ammonia, preferably anhydrous ammonia, into the acid after it has been heated to the aforementioned tempertaure. The resultant exothermic heat of reaction between the ammonia and the acid is therefore available to aid the evaporation of the volatile impurities and water from the mixture of ammonium phosphates and wet-process phosphoric acid to accomplish the desired degree of concentration.

The degree of concentration of the product depends primarily on the nature and amount of metallic impurities contained therein. As disclosed in my parent applications, wet-process acid is concentrated sufficiently that when neutralized with ammonia and diluted with water a clear aqueous solution of ammonium phosphates free of precipitates is obtained. Generally, for most wet-process phosphoric acids, the preferred concentration of phosphorus (expressed as $P_2O_5$) on an impurity free basis is between about 69 and about 74 weight percent. In this invention, the concentration of the mixture of ammonium phosphates and wet-process acid must be sufficient to form an amount of acyclic polyphosphates which will chelate all the insoluble metal impurities. As disclosed in my copending application, the relationship between the amount of phosphorus which must be present as acyclic polyphosphates and the metal impurities is expressed by the following:

$$P_2O_5 \text{ poly} = \frac{C}{2}\left[M - \frac{K}{(2P_2O_5 \text{ ortho})^a}\right]$$

wherein C is determined by the following:

$$C = \frac{2Fe + 2Al + 12Mg + 4Zn + 3Cu + 2V}{Fe + Al + Mg + Zn + Cu + V}$$

$a$=average valance of impurities and is determined by the following:

$$a = \frac{3Fe + 3Al + 2Mg + 2Zn + 2Cu + 5V}{Fe + Al + Mg + Zn + Cu + V}$$

The atomic symbols represent the gram atomic weights of their respective metals per 100 grams of the product.

M=total gram atomic weight of metals per 100 grams of product, $P_2O_5$ ortho=total gram molecular weights of phosphorus present as orthophosphates per 100 grams of product, calculated as $P_2O_5$, $P_2O_5$ poly=total gram molecular weights of phosphorus present as acyclic polyphosphates per 100 grams of product, calculated as $P_2O_5$, and K is between 0 and about $0.5 \times 10^{-2}$.

The amount of polyphosphates in weight percent of total phosphorus to acid is dependent upon the concentration of the mixture expressed on an impurity free basis. The following table sets forth the concentration of polyphosphate acids as a function of the ratio of total water to total $P_2O_5$ in the mixture of ammonium phosphates and wet-process phosphoric acid:

TABLE 1

| $H_2O/P_2O_5$ mol ratio | Gram mol weights of $P_2O_5$ in polyphosphoric acid | Polyphosphoric acid wt. percent of total phosphorus |
| --- | --- | --- |
| 3.6 | (1) | (1) |
| 3.5 | 0.0065 | 1.3 |
| 3.3 | 0.021 | 4.2 |
| 3.0 | 0.060 | 11.8 |
| 2.8 | 0.15 | 28.9 |
| 2.5 | 0.24 | 45.3 |
| 2.0 | 0.45 | 80.0 |

[1] Trace amounts.

The method of this invention comprises the introduction of anhydrous ammonia into the body of the wet-process acid after the latter has been heated to an elevated temperature of at least about 100° C., but before the acid has been concentrated to the stable, anhydrous state where it contains a sufficient quantity of polyphosphates to chelate all the metallic impurities. The concentration of the acid and simultaneous contacting with ammonia can be performed at atmospheric or, if desired, at subatmospheric pressure. The process can be operated batchwise by charging the acid into a suitable vessel and heating it therein to a temperature of about 100° C., preferably about 120° C., and most preferably about 185° C., and removing the volatile impurities and water vaporized therefrom. The lower temperatures of heating, aforementioned, are most useful when subatmospheric pressures are used. Generally, however, the process is performed at atmospheric pressures. Anhydrous ammonia can then be gradually introduced into the heated acid to provide at least about 0.14 part by weight of nitrogen per part by weight of $P_2O_5$ contained in the acid. Preferably, the amount of anhydrous ammonia so introduced is sufficient that an aqueous solution of the reaction product has a pH value between about 5.5 and about 10.0, most preferably between about 6.5 and about 8.5. In order to maintain the reaction temperature high enough to avoid solidification of the product, it may or may not be necessary to add heat to the reaction vessel. The reaction itself is exothermic and by suitably designing and insulating the reaction vessel it is possible to maintain the desired reaction temperature utilizing the exothermic heat of reaction as the sole source of heat. Otherwise the reaction vessel is provided with means for supplying heat thereto from an outside source.

The immediate product of the reaction is a hot liquid material comprising molten ammonium phosphates (mono and dihydrogen) and the majority of the impurities originally present in the crude wet-process acid. The product is allowed to cool to atmospheric temperature whereupon it solidifies to a substantially nonhygroscopic solid which can be granulated by conventional means to form a substantially free-flowing solid ammonium phosphate fertilizer suitable for direct application to the soil by spreading, drilling, dusting, etc. Such solid product, however, is but slowly dissolved in cold water. The product can be obtained with a nitrogen content from 6 to 22 percent, preferably from 8 to 20 and most preferably from 15 to 20 weight percent with a $P_2O_5$ content from 45 to 65 weight percent, typically from 40 to 60 weight percent.

The exact nature of the ammonium phosphate product is not known with certainty. It is believed, however, that the major proportion of the product is a mixture of ammonium orthophosphates and ammonium polyphosphates with the presence of some P–N bonds, e.g., phosphoamide or phosphoimide compounds. The solids have high melting points, from about 165° to 225° C.

The following examples will illustrate a mode of practice of my invention:

EXAMPLE 1

About 500 parts by weight of wet-process phosphoric acid containing about 53 weight percent of $P_2O_5$ content were charged to a vessel and therein slowly heated with rapid stirring to a temperature of about 185° C. During the heating, white vapors were evolved from the acid. The water vapor in the volatilized portion was condensed and comprised 75 parts. While maintaining said heating, 120 parts of anhydrous ammonia were slowly added, the rate of ammonia addition being controlled to maintain a relatively constant temperature. During the ammoniation, the temperature rose to about 197° C. and 60 additional parts of water were removed. The reaction mass after ammoniation was sampled and the sample upon cooling to room temperature was a hard, dense, green solid having about 13 percent by weight of nitrogen and 55 percent by weight of phosphorus calculated as $P_2O_5$. This sample was nonhygroscopic and had an initial melting point of 173° C. and a final melting point of 200° C.

A portion of the ammoniated product was diluted with water and the pH adjusted to about 8 with 28% aqueous ammonia. The liquid ammonium phosphate product so obtained was a clear liquid and contained about 8% by weight of nitrogen and about 20% by weight of phosphorus calculated as $P_2O_5$.

EXAMPLE 2

About 1000 parts by weight of wet-process phosphoric acid containing about 53 weight percent of $P_2O_5$ content were charged to a vessel and therein slowly heated with an electric heating mantle and with rapid stirring to a temperature of about 195° C. During the heating there was a copious evolution of white vapors from the acid, which evolution substantially ceased within about 5 minutes after the temperature reached 195° C. The water vapor volatilized from the acid was condensed and measured 181 milliliters. While still maintaining the temperature in excess of 160° C., anhydrous ammonia was slowly added in an amount sufficient to neutralize the acid. A sample was withdrawn from the reaction mixture and allowed to cool to room temperature, whereupon it solidified to a substantially nonhygroscopic mass which had a slow dissolution rate in cold water. When the dilute wet-process acid is neutralized with anhydrous ammonia, the reaction product is a thick gelatinous semisolid paste.

The preceding examples are intended solely to illustrate a mode of practicing my invention and are not to be construed as unduly limiting thereof. My invention is intended to be defined by the reagents and steps and their obvious equivalents set forth in the following claims.

I claim:
1. The method of preparing an improved nonhygroscopic ammonium phosphate solid having a slow dissolution rate from a wet-process phosphoric acid containing from 1 to about 10 weight percent incidental metallic impurities comprising iron and aluminum which normally precipitate as gelatinous solids upon neutralization of the acid, the improved method of neutralization that comprises:

heating said wet-process phosphoric acid reactant to a temperature greater than about 150° C. and concentrating said acid by removing volatilized impurities and water therefrom;

simultaneously with said heating introducing ammonia reactant into contact with said wet-process acid in an amount sufficient to neutralize said acid to a pH value between about 5.5 and 10.0 and form said ammonium phosphate and utilizing the exothermic heat of reaction between said acid and ammonia reactants to maintain said temperature above about 150° C. during said introduction;

continuing to remove volatilized impurities and water from said reactants during the introduction of said ammonia until the reaction mass is sufficiently concentrated that when diluted with water, a clear, aqueous solution of ammonium phosphates free of precipitates will be obtained;

thereupon discontinuing said concentrating and contacting with ammonia and cooling the reaction mass to solidify it as said solid ammonium phosphate product.

2. The method of claim 1 wherein the amount of ammonia introduced into contact with said wet-process phosphoric acid is sufficient to provide a solid ammonium phosphate containing about 13 weight percent nitrogen.

3. The method of claim 1 wherein the temperature of said acid is maintained at about 150°–200° C. during the introduction of said ammonia.

4. In the method wherein a solid ammonium phosphate of improved properties is produced by ammonia neutralization of a concentrated wet-process phosphoric acid prepared from wet-process phosphoric acid having a concentration from about 25 to about 55 weight percent $P_2O_5$ and containing from 1 to about 10 weight percent, calculated as the oxides, of metallic impurities comprising iron and aluminum and wherein said concentrated wet-process acid is obtained by heating said dilute wet-process acid to a temperature from about 150° to 400° C. to concentrate said acid by the removal of volatile impurities and water therefrom until said acid contains from 1.3 to 80 percent of its phosphorus as polyphosphoric acid, sufficient when neutralized with ammonia and diluted with water to form a clear aqueous solution of ammonium phosphates, the improved method of effecting said concentrating and neutralizing of said acid that comprises introducing anhydrous ammonia into said acid during said concentration and utilizing the exothermic heat of reaction between said acid and ammonia to aid the volatilization of impurities and water therefrom, the amount of said ammonia being sufficient to neutralize said acid and provide at least 0.14 part by weight of nitrogen per part by weight of $P_2O_5$ in said ammonium phosphate product.

5. The method of claim 1 wherein the amount of ammonia introduced into said wet-process phosphoric acid is sufficient to provide a solid ammonium phosphate containing from about 6 to about 22 weight percent nitrogen.

6. The method of claim 1 wherein said heating and contacting with ammonia is performed at atmospheric pressure.

7. The method of claim 1 wherein said heating and said contacting with ammonia is performed at subatmospheric pressure.

References Cited

UNITED STATES PATENTS

| | | | |
|---|---|---|---|
| 1,264,513 | 4/1918 | Hechenbleikner | 23—107 |
| 1,264,514 | 4/1918 | Hechenbleikner | 23—107 |
| 3,201,195 | 8/1965 | Huber et al. | 23—107 |
| 3,264,085 | 8/1966 | Hignett et al. | 23—107 |

OSCAR R. VERTIZ, Primary Examiner.

L. A. MARSH, Assistant Examiner.